US008254553B2

(12) United States Patent
Agarwal et al.

(10) Patent No.: US 8,254,553 B2
(45) Date of Patent: Aug. 28, 2012

(54) SYSTEMS, METHODS, AND COMPUTER PROGRAM PRODUCTS FOR NUMBER TRANSLATION WITH LOCAL DIRECTORY NUMBER SUPPORT

(75) Inventors: Devesh Agarwal, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1014 days.

(21) Appl. No.: 12/228,250

(22) Filed: Aug. 11, 2008

(65) Prior Publication Data

US 2009/0041225 A1 Feb. 12, 2009

Related U.S. Application Data

(60) Provisional application No. 60/964,395, filed on Aug. 10, 2007.

(51) Int. Cl.
H04M 3/42 (2006.01)
H04M 7/00 (2006.01)

(52) U.S. Cl. .......... 379/221.13; 379/221.08; 379/221.14

(58) Field of Classification Search ............. 379/221.13, 379/221.14, 221.08–221.12
See application file for complete search history.

(56) References Cited

U.S. PATENT DOCUMENTS

| | | | |
|---|---|---|---|
| 4,754,479 A | 6/1988 | Bicknell et al. |
| 4,962,497 A | 10/1990 | Ference et al. |
| 5,457,692 A | 10/1995 | Ishinabe et al. |
| 5,546,398 A | 8/1996 | Tucker et al. |
| 5,550,914 A | 8/1996 | Clarke et al. |
| 5,572,579 A | 11/1996 | Orriss et al. |
| 5,583,926 A | 12/1996 | Venier et al. |
| 5,586,177 A | 12/1996 | Farris et al. |
| 5,598,464 A | 1/1997 | Hess et al. |
| 5,602,909 A | 2/1997 | Carkner et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |

(Continued)

FOREIGN PATENT DOCUMENTS

EP 0 669 771 A1 8/1995

(Continued)

OTHER PUBLICATIONS

Official Action for U.S. Appl. No. 11/545,789 (Mar. 16, 2011).

(Continued)

*Primary Examiner* — Harry Hong
(74) *Attorney, Agent, or Firm* — Jenkins, Wilson, Taylor & Hunt, P.A.

(57) ABSTRACT

Methods, systems, and computer program products for number portability with local directory number support are disclosed. According to one aspect, the subject matter herein includes a system for providing number translation with local directory number support. The system includes a communications node for receiving, from a message source, a first message that includes information identifying a subscriber. The system also includes a number translation module, operatively associated with the communications node, for determining a network address and a local directory number associated with the identified a subscriber, and for at least one of: including the network address and local directory number in the first message and forwarding the first message to a destination of the first message; and including the network address and local directory number in a second message and sending the second message to the source of the first message.

24 Claims, 11 Drawing Sheets

U.S. PATENT DOCUMENTS

| | | | |
|---|---|---|---|
| 5,711,284 A | 1/1998 | Keenan, Jr. | |
| 5,740,239 A | 4/1998 | Bhagat et al. | |
| 5,764,745 A | 6/1998 | Chan et al. | |
| 5,768,358 A | 6/1998 | Venier et al. | |
| 5,771,284 A | 6/1998 | Sonnenberg | |
| 5,796,813 A | 8/1998 | Sonnenberg | |
| 5,828,729 A * | 10/1998 | Clermont et al. | 379/32.01 |
| 5,867,570 A * | 2/1999 | Bargout et al. | 379/221.13 |
| 5,881,145 A * | 3/1999 | Giuhat et al. | 379/221.13 |
| 5,949,871 A | 9/1999 | Kabay et al. | |
| 6,009,160 A | 12/1999 | Sonnenberg | |
| 6,021,126 A | 2/2000 | White et al. | |
| 6,108,332 A | 8/2000 | Kasiviswanathan | |
| 6,128,377 A | 10/2000 | Sonnenberg | |
| 6,134,316 A | 10/2000 | Kallioniemi et al. | |
| 6,138,023 A | 10/2000 | Agarwal et al. | |
| 6,272,136 B1 | 8/2001 | Lin et al. | |
| 6,321,268 B1 | 11/2001 | Dillon et al. | |
| 6,373,930 B1 * | 4/2002 | McConnell et al. | 379/114.28 |
| 6,424,621 B1 | 7/2002 | Ramaswamy et al. | |
| 6,427,010 B1 * | 7/2002 | Farris et al. | 379/221.13 |
| 6,438,223 B1 | 8/2002 | Eskafi et al. | |
| 6,456,708 B1 | 9/2002 | Copley et al. | |
| 6,456,845 B1 | 9/2002 | Drum et al. | |
| 6,466,792 B1 | 10/2002 | Copley | |
| 6,510,164 B1 | 1/2003 | Ramaswamy et al. | |
| 6,535,599 B1 | 3/2003 | Torrey et al. | |
| 6,574,327 B2 | 6/2003 | Clark et al. | |
| 6,639,981 B1 | 10/2003 | Dunn, Jr. et al. | |
| 6,647,113 B2 | 11/2003 | McCann et al. | |
| 6,763,103 B1 | 7/2004 | Willrett | |
| 6,914,973 B2 | 7/2005 | Marsico et al. | |
| 6,987,781 B1 | 1/2006 | Miller et al. | |
| 7,620,034 B1 * | 11/2009 | Tran et al. | 370/352 |
| 7,626,979 B1 * | 12/2009 | Bugenhagen et al. | 370/352 |
| 7,636,431 B2 * | 12/2009 | Williams et al. | 379/221.13 |
| 2001/0040957 A1 | 11/2001 | McCann et al. | |
| 2002/0054674 A1 | 5/2002 | Chang et al. | |
| 2002/0196779 A1 | 12/2002 | Khadri et al. | |
| 2003/0007483 A1 | 1/2003 | Um | |
| 2003/0108067 A1 | 6/2003 | Craig et al. | |
| 2003/0133561 A1 | 7/2003 | Torrey et al. | |
| 2003/0235285 A1 | 12/2003 | Marsico | |
| 2004/0062377 A1 * | 4/2004 | Daoud et al. | 379/229 |
| 2004/0081206 A1 | 4/2004 | Allison et al. | |
| 2004/0096049 A1 | 5/2004 | Delaney et al. | |
| 2004/0156394 A1 | 8/2004 | Westman | |
| 2004/0193725 A1 | 9/2004 | Costa-Requena et al. | |
| 2006/0193461 A1 * | 8/2006 | Gavillet et al. | 379/221.13 |
| 2007/0008955 A1 | 1/2007 | Delaney et al. | |
| 2007/0121908 A1 | 5/2007 | Benedyk et al. | |
| 2007/0165516 A1 | 7/2007 | Xu et al. | |
| 2008/0143817 A1 | 6/2008 | Miali et al. | |
| 2008/0159501 A1 | 7/2008 | Cai | |
| 2009/0041223 A1 | 2/2009 | Agarwal et al. | |
| 2009/0073938 A1 | 3/2009 | Zhu et al. | |

FOREIGN PATENT DOCUMENTS

| | | |
|---|---|---|
| EP | 1 100 279 A2 | 5/2001 |
| EP | 1 282 983 | 8/2010 |
| WO | WO 97/33441 A1 | 9/1997 |
| WO | WO 97/42776 A2 | 11/1997 |
| WO | WO 99/25130 A1 | 5/1999 |
| WO | WO 00/16583 A1 | 3/2000 |
| WO | WO 00/60839 | 10/2000 |
| WO | WO 00/76134 A1 | 12/2000 |
| WO | WO 01/86971 A1 | 11/2001 |
| WO | WO 2005/027460 A1 | 3/2005 |
| WO | WO 2007/044689 A2 | 4/2007 |

OTHER PUBLICATIONS

Interview Summary for U.S. Appl. No. 11/545,789 (Jan. 13, 2011).

Chinese Official Action for Chinese Patent Application No. 200680045945.9 (Oct. 19, 2010).

Final Official Action for U.S. Appl. No. 11/545,789 (Oct. 5, 2010).

European Search Report for European application No. 06816566.1 (Aug. 30, 2010).

Official Action for U.S. Appl. No. 11/545,789 (Apr. 29, 2010).

Communication under Rule 73(3) EPC for European Application No. 01933084.4 (Feb. 23, 2010).

Vemuri et al., "Session Initiation Protocol for Telephones (SIP-T): Context and Architectures," Network Working Group, RFC 3372 (Sep. 2002).

Rosenberg et al., "SIP: Session Initiation Protocol," Network Working Group, RFC 3261 (Jun. 2002).

George et al., "SS7 MTP2-User Peer-to-Peer Adaptation Layer," Network Working Group, <draft-ietf-sigtran-m2pa-05.txt>, p. 1-50 (May 3, 2002).

Sidebottom et al., "SS7 MTP3-User Adaptation Layer (M3UA)," Network Working Group, <draft-ietf-sigtran-m3ua-12.txt>, p. 1-109 (Feb. 2002).

CISCO, "SIP Diversion Header Implementation for Redirecting Number," Appendix B of Text No. OL-0894-01, pp. B81-B90 (Copyright 2002).

Choudhuri et al., "SIP INFO Method for DTMF Digit Transport and Collection," Internet Engineering Task Force, draft-choudhuri-sip-info-digit-00.txt (Apr. 10, 2000).

Stewart et al., "Stream Control Transmission Protocol," Network Working Group, RFC 2960 (Oct. 2000).

Non-Final Official Action for U.S. Appl. No. 12/228,249 (Jul. 21, 2011).

Communication regarding the expirey of the time limit within which notice of opposition may be filed for European application No. 01933084.4 (Jun. 16, 2011).

Communication pursuant to Article 94(3) EPC for European Application No. 01 933 084.4 (Jan. 12, 2009).

Notification Concerning Transmittal of International Preliminary Report on Patentability for International Application No. PCT/US2006/039436 (Apr. 17, 2008).

Notification of Transmittal of the International Search Report and the Written Opinion of the International Searching Authority, or the Declaration for International Application No. PCT/US2006/039436 (Aug. 9, 2007).

Supplemental Notice of Allowability for U.S. Appl. No. 09/503,541 (Aug. 5, 2003).

Supplemental Notice of Allowability for U.S. Appl. No. 09/823,061 (Jul. 28, 2003).

Supplemental Notice of Allowability for U.S. Appl. No. 09/503,541 (May 1, 2003).

Notice of Allowance and Fee(s) Due for U.S. Appl. No. 09/503,541 (Apr. 16, 2003).

Notice of Allowance and Fee(s) Due for U.S. Appl. No. 09/823,061 (Apr. 11, 2003).

Official Action for U.S. Appl. No. 09/503,541 (Mar. 11, 2003).

Interview Summary for U.S. Appl. No. 09/823,061 (Jan. 30, 2003).

Official Action for U.S. Appl. No. 09/823,061 (Nov. 21, 2002).

Notification of Transmittal of International Preliminary Examination Report for International Application No. PCT/US01/14582 (Jul. 3, 2002).

Official Action for U.S. Appl. No. 09/823,061 (Jun. 18, 2002).

Morneault et al., "Signaling System 7 (SS7) Message Transfer Part 2 (MTP2)-User Adaptation Layer," pp. 1-83, (2002)

Sidebottom et al., "Signaling System 7 (SS7) Message Transfer Part 3 (MTP3)-User Adaptation Layer (M3UA)," The Internet Society, pp. 1-106, (2002).

Sprague, D., "Tekelec's Transport Adapter Layer Interface," The Internet Society, pp. 1-93, (2001).

Notification of Transmittal of the International Search Report or the Declaration for International Application No. PCT/US01/14582 (Oct. 17, 2001).

"Packet-Based Multimedia Communications Systems," International Telecommunication Union, H.323 (Nov. 2000).

"Call Signaling Protocols and Media Stream Packetization for Packet-Based Multimedia Communication Systems," International Telecommunication Union, H.225.0 (Nov. 2000).

"Control Protocol for Multimedia Communication," International Telecommunication Union, H.245, (Nov. 2000).

Goldman, Chris, "Chasing WINP," Wireless Review, pp. 14-16, 18-21, (Aug. 15, 2000).

Stewart, et al., "Stream Control Transmission Protocol," The Internet Society, pp. 1-118, (2000).

"IP7 Secure Gateway Release 1.0," Tekelec, (Nov. 1999).

Vittore, "Enhanced Offerings Shoot for Easy," Telephony, p. 48, 50-51 (Mar. 8, 1999).

Lin et al., "Number Portability for Telecommunication Networks," IEEE, pp. 56-62, (1999).

Handley, et al., "SIP: Session Intitiaton Protocol," The Internet Society, pp. 1-134, (1999).

McGrew, "Transport SS7 Signalling Over IP," Lucent Technologies Inc., 99. 1-8, (1998).

Levine, "Pancaking Portability," American's Network, p. 55-56, (Oct. 1, 1998).

Eagle, "Feature Guide Eagle STP," Tekelec, Inc., pp. i-vi, 1-208, (Jan. 1998).

"Feature Guide LNP LSMS," Tekelec, (Jan. 1998).

Moy, J., "OSPF Version 2," The Internet Society, pp. 1-191, (1998).

Chen, "Local No. Portability: Operations Impact and Architecture," BellSouth Telecommunications, pp. 973-981, (1998).

O'Shea, "The Network That's Never Done," Telephony, p. 38, 40, 42-43, (Sep. 15, 1997).

Patt, Rice, "Local Number Portability," Phone+Magazine, p. 1-2, (Jul. 19, 1997).

O'Shea, "The Great Seeping Software Takeover," Telephony, p. 32, 36, 38, 42, (Jun. 30, 1997).

Anonymous, "Alliances," Communications Week, p. 14-15, (Apr. 7, 1997).

Engebretson, "Much Ado About Numbers," Telephony, p. 22-24, 26, 28, (Apr. 7, 1997).

Bellcore, "NetPilot™-STP Interface for Administration of STP-BAsed Local Number Portability (LNP_Translations," Bellcore Communications Research, SR-4251, Issue 1, pp. 1-239, (Mar. 19, 1997).

Smith, "Number Portability Pileup," Telephony, pp. 22, 24, 26, (Jan. 6, 1997).

Snyder, "Testing Portability Possibilities," Telephony, p. 70, (Nov. 18, 1996).

Anonymous, "Generic Switching and Signaling Requiriements for Number Portability," AT&T Network Systems, Issue 1, pp. 1-75, (Feb. 2, 1996).

Notice of Abandonment for U.S. Appl. No. 11/545,789 (Sep. 30, 2011).

* cited by examiner

SYSTEMS, METHODS, AND COMPUTER PROGRAM PRODUCTS FOR NUMBER TRANSLATION WITH LOCAL DIRECTORY NUMBER SUPPORT

PRIORITY CLAIM

This application claims the benefit of U.S. Provisional Patent Application Ser. No. 60/964,395, filed Aug. 10, 2007; the disclosure of which is incorporated herein by reference in its entirety.

TECHNICAL FIELD

The subject matter described herein relates to systems and methods for routing calls through a telecommunications network. More particularly, the subject matter described herein relates to systems, methods, and computer program products for number translation with local directory number support.

BACKGROUND

Historically, a telephone service subscriber's directory number (colloquially referred to as the "telephone number") identified the physical circuit or line that was connected to the customer's premises, one of many circuits or lines handled by a telephone switch. This physical circuit is also referred to as a switching port. The telephone switch, also referred to as a switching office, central office, or local exchange, is hereinafter referred to generically as a switching point or SP. Thus, a local telephone number "XXX-YYYY" indicated that the line, called the local loop, that connected the SP to the customer's premises was connected to switching port "YYYY" on switch "XXX". When a subscriber changed locations, the subscriber's telephone number was also changed, representing a change from one switching port to another switching port, either in the same SP or a different SP. Since the telephone number of a called party corresponded to the physical circuit connecting the SP to the called party's premises, the telephone number itself was essentially the network address of the called party. For example, calling party A dials the telephone number of called party B, which is "123-4567". The switch connected to calling party A's phone routes the call to local exchange 123; once the call reaches local exchange 123, the exchange routes the call to its own switching port 4567, which is physically connected to the local loop for called party B.

However, there are some situations where the correlation between a subscriber's directory number and a physical switch and port in a telephone exchange is no longer appropriate, in which case an additional layer of abstraction is needed to map the subscriber's directory number to specific hardware in a switch. One situation where a number translation function is needed involves number portability (NP), which refers to the ability of a telephone subscriber to retain the same directory number while changing geographic locations or service providers. Telephone number portability was mandated in the United States by the Telecommunications Act of 1996. In the number portability scenario, for example, if a subscriber has changed geographic locations and/or providers but wants to keep his or her current directory number, that subscriber may be added to a number portability lookup database that maps the subscriber to the network address of the switching point to which the subscriber has been ported.

There are other situations in which a number translation function is needed or useful. Switching office cutover (CTO), for example, refers to the situation where a subscriber has not changed geographic location or service provider, but is merely being migrated from one telephone exchange to another, such as when an old telephone exchange equipment or building is being replaced with a new building or equipment. In this situation, calls formerly directed to the old exchange must be redirected to the new exchange, e.g., by translating the subscriber's telephone number to the network address of the new exchange that now handles the subscriber.

Call offloading (CO) is another example of number translation, where a call that normally travels through a public switched telephone network (PSTN) is routed to another network, such as to a high-speed digital backbone. For example, the call may be rerouted to avoid a congested PSTN node or trunk. In such a case, the address of the intermediate routing nodes may be remapped from PSTN nodes to packet network nodes (and back) via gateway node(s) connecting both networks. Call offloading may redirect calls from SS7-based networks, such as PSTN, 2G, Wireless, GSM, IS-41, etc., to non-SS7-based networks, such as networks based on Internet protocol multimedia subsystem (IMS), next generation network (NGN), session initiation protocol (SIP), H.323, and others.

An advanced routing number (ARN) function is another example of number translation, where the destination of a call, for example, may be modified based on parameters and conditions. A call to a toll-free number, for example, may be mapped to the number of an east-coast or west-coast office, or even an overseas office, depending on the time of day and which office is open at the time of the call.

However, while number translation functions such as NP, CTO, CO, and ARN return the network address of the recipient SP, i.e., the switching point to which the call must be redirected, the recipient SP must further process the call to determine the final destination of the call, e.g., the specific line card/port within the SP. Typically, this requires an additional number translation or number lookup operation to determine a local directory number (LDN), which is private to the recipient switching office. Thus, while conventional number translation functions provide the address of the recipient SP, they do not provide enough information to completely identify the final destination of the call, causing a need for an additional database access. Performing two number translation operations is inefficient and time-consuming and requires that the recipient SP have the capability to perform a database or other datastore access, which increases the cost and complexity of the SP.

Accordingly, there exists a need for number translation with local directory number support.

SUMMARY

According to one aspect, the subject matter herein includes a system for providing number translation with local directory number support. The system includes a communications node for receiving, from a message source, a first message that includes information identifying a subscriber. The system also includes a number translation module, operatively associated with the communications node, for determining a network address and a local directory number associated with the identified a subscriber, and for at least one of: including the network address and local directory number in the first message and forwarding the first message to a destination of the first message; and including the network address and local directory number in a second message and sending the second message to the source of the first message.

As used herein, the term "operatively associated" as applied to two entities means that the entities communicate or interact with each other. The two entities may be physically co-located (e.g., physically on the same hardware or software platform) or may be physically separate from each other (e.g., on physically separate platforms in the same geographic location or in physically separate geographic locations.)

According to another aspect, the subject matter described herein includes a method for providing number translation with local directory number support. At a node for processing network signaling messages, a first message is received from a message source, the first message including information identifying a subscriber. The information identifying a subscriber is used to determine a network address and a local directory number for the identified subscriber. The network address and local directory number are included in the first message, which is forwarded to its destination, or included in a second message, which is sent to the source of the first message, or both.

The subject matter described herein for number translation with local directory number support may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer program products are provided for number translation with local directory number support.

Figure 1:
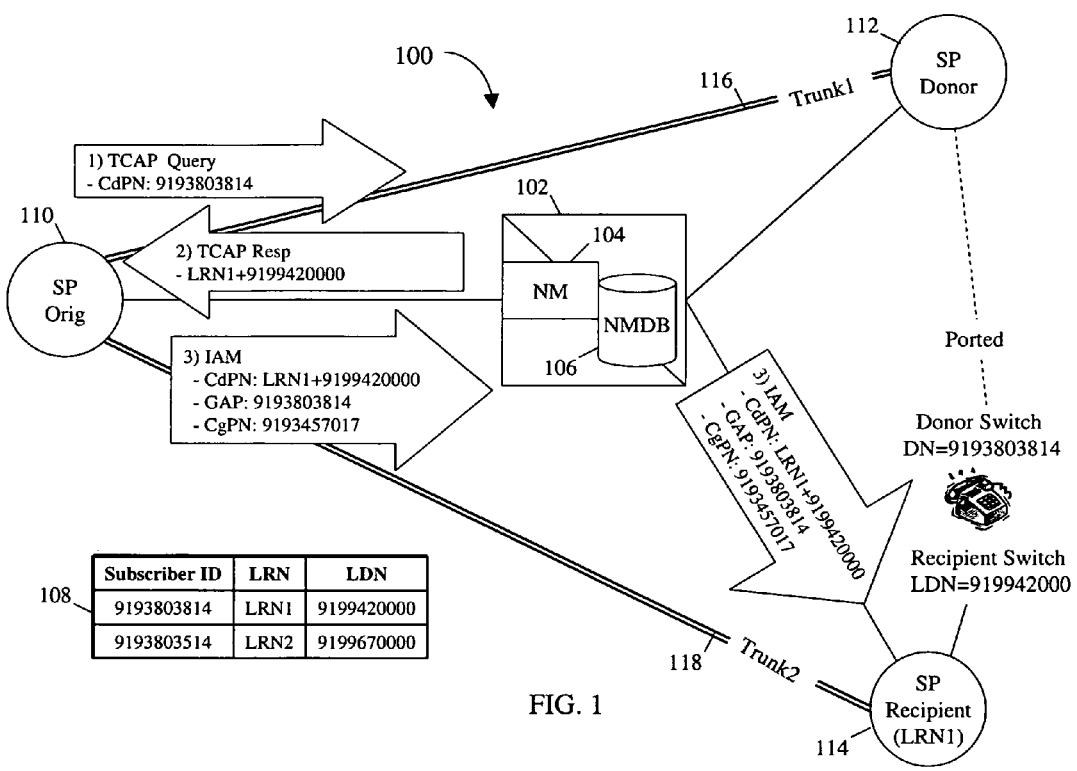
FIG. 1 is a block diagram illustrating an exemplary system for providing triggered number translation with local directory number support according to an embodiment of the subject matter described herein.

FIG. 1 is a block diagram illustrating an exemplary system for providing triggered number translation with local directory number support according to an embodiment of the subject matter described herein. System 100 includes a communications node 102 for receiving a request for number translation, the request including information identifying a subscriber. Information identifying the subscriber may be information identifying a called party, a calling party, or another party associated with the call. For example, the information identifying the subscriber may be a directory number (DN), a universal resource identifier (URI), a session initiation protocol (SIP) address, an IP address, a point code/subsystem address, or other information by which the subscriber may be identified.

In one embodiment, node 102 may be a component of a signaling message routing node. For example, node 102 may be, or may be a component of, a signal transfer point (STP), a service control point (SCP), a session initiation protocol (SIP) application server or other type of application server (AS), an Internet protocol multimedia subsystem (IMS) node, a next generation networking (NGN) node, a media gateway controller (MGC), a softswitch, a signaling gateway (SGW), a session border controller (SBC), or any other type of node involved in signaling transfer. Example IMS nodes include call session control function (CSCF) nodes, interconnect border control function (IBCF) nodes, SIP session router nodes, media resource function controller (MRFC) nodes, media resource function processor (MRFP) nodes, and breakout gateway control function (BGCF) nodes.

System 100 also includes a number translation module (NM) 104 operatively associated with communications node 102. NM 104 uses the information identifying the subscriber to determine whether number translation information and local directory number (LDN) information exists for the identified subscriber. If such information exists, NM 104 sends a response to the request for number translation, the response including the number translation information and LDN information for the identified subscriber. If such information does not exist, NM 104 may either send a response indicating that the information does not exist, or it may send no response, in which case the requesting entity may determine that the information does not exist by the absence of a query response before the expiration of a timeout period.

In one embodiment, NM 104 may be operatively associated with a number translation database NMDB 106 for maintaining an association between a subscriber identifier and number translation and LDN information for the subscriber. NMDB 106 may contain one or more number translation records 108 for associating a subscriber identifier to number translation information and LDN information. For example, each number translation record 108 may associate a subscriber directory number with a location routing number and local directory number. In alternative embodiments, NM 104 may perform a table lookup, access a data structure in memory, or use some other means to retrieve number translation information and LDN information associated with a subscriber. In one embodiment, NMDB 106 may include data entries or information for all subscribers. In an alternative embodiment, NMDB 106 may include data entries or information only for ported subscribers. In one embodiment, NM 104 may be co-located with NMDB 106. In an alternative embodiment, NM 104 may be remote from (i.e., physically separate from, or not co-located with) NMDB 106.

In one embodiment, NM 104 may receive a number translation request from a switching point, such as from originating SP 110. Originating SP 110 may be a service switching point (SSP), a mobile switching center (MSC), a public switched telephone network (PSTN) end office, a media gateway controller (MGW), a softswitch (SS), a SIP application server, an IMS node, or other entity capable of issuing a number translation request. For example, originating SP 110 may be an MSC that is handling a call from a mobile subscriber calling party.

The number translation request may be in the form of a query, such as a database query, a table lookup, or access to a data structure, for example. For example, NM 104 may receive a transaction capabilities application part (TCAP) query using SS7/SIGTRAN signaling links. Alternatively, the number translation request could use one or more other protocols, such as an Internet protocol (IP), a signaling connection and control part (SCCP) user adaptation (SUA) protocol, a session initiation protocol (SIP), an extensible markup language (XML) protocol, a hypertext transfer protocol (HTTP), and a simple object access protocol (SOAP) to access number translation and local directory number information associated with a subscriber.

NM 104 may perform a number translation function to determine whether number translation information and local directory number information exists for an identified subscriber. In one embodiment, NM 104 may perform a number portability (NP) translation for determining whether a subscriber has been ported from donor switching point to recipient switching point, such as from donor SP 112 to recipient SP 114, connected to originating SP 110 via trunk1 116 and trunk2 118, respectively. In this embodiment, the response from NM 104 may include a location routing number (LRN) that identifies the recipient SP.

In one embodiment, NM 104 may perform a call offload (CO) translation for determining whether a call should be offloaded (e.g., re-routed) from a SS7-based network to a non-SS7-based network. In this embodiment, the response from NM 104 may include a call offload routing number (ORN) that identifies an SS7 gateway node or other non-SS7 network entity.

In one embodiment, NM 104 may perform a switching office cutover (CTO) translation for determining whether a subscriber has been migrated from one central office to another central office. In this embodiment, the response from NM 104 may include a switching office cutover (CTO) routing number that identifies the migrated-to switch.

In one embodiment, NM 104 may perform an advanced routing number (ARN) translation for determining whether to redirect the call based on advanced routing rules. In this embodiment, the response from NM 104 may include an advanced routing system identifier (ARS ID), carrier identifier, or a routing number that identifies a network entity to which the signaling message should be routed.

In alternative embodiments, the response from NM 104 may include a point code/subsystem number, a universal resource identifier, an IP address, or other information useful to identify the destination of, or route a call to, a translated number.

An example operation of system 100 will now be described with reference to FIG. 2.

Figure 2:
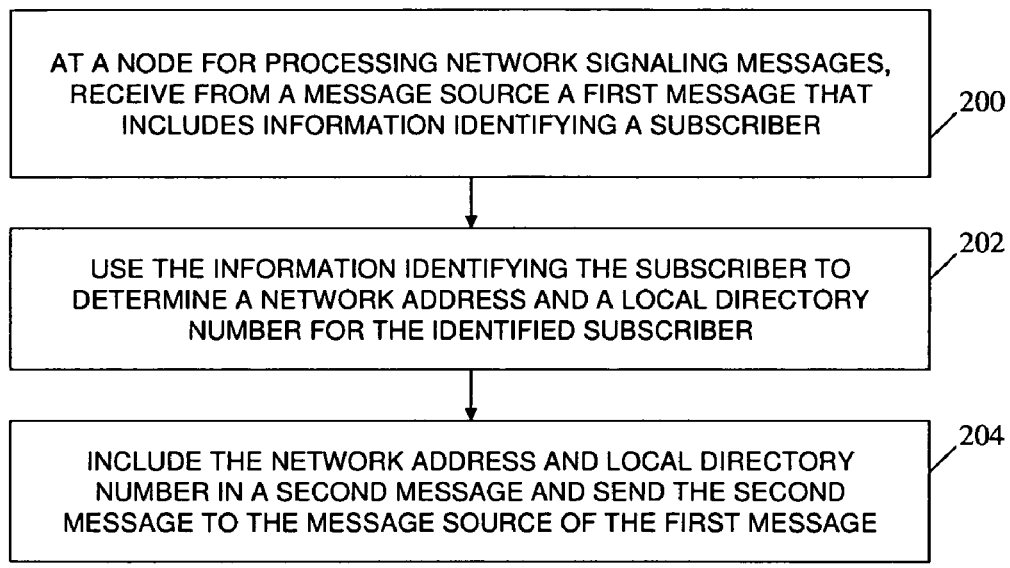
FIG. 2 is a flow chart illustrating an exemplary process for performing triggered number translation with local directory number support according to an embodiment of the subject matter described herein.

FIG. 2 is a flow chart illustrating an exemplary process for performing triggered number translation with local directory number support according to an embodiment of the subject matter described herein.

At block 200, a first message, sent from a message source and including information identifying a subscriber, is received at a node for processing network signaling messages. Example nodes for processing network signaling messages include STPs, SGs, and SCPs. In one embodiment, the first message may be a query message, generated in response to a trigger or detection of a trigger condition on originating SP 110. For example, the first message may be a TCAP query sent by originating SP 110 to node 102 (FIG. 1, message 1), the query including the called party number (CdPN).

At block 202, the information identifying a subscriber is used to determine a network address and local directory number (LDN) associated with the identified subscriber. For example, node 102 may pass the TCAP query to NM 104, which may extract the called party number CdPN from the message and use the CdPN to query NMDB 106. NMDB 106 may contain a number translation record 108 that associates the called party number "9193803814" with a location routing number, represented in FIG. 1 by the text "LRN1", and a local directory number, such as "9199420000".

At block 204, the network address and local directory number associated with the subscriber are included in a second message, which is sent to the message source of the first message. For example, NM 104 may send a TCAP response (FIG. 1, message 2) to originating SP 110, the response containing the number translation information (e.g., LRN) and LDN information associated with the subscriber. In one embodiment, the number translation information may be prepended to the LDN information. For example, the TCAP response may include the value "LRN1+9199420000" as a parameter or portion of the message. In alternative embodiments, the number translation and LDN information may be sent as values stored in other, and possibly separate, parameters or fields of the query response.

Upon receiving the TCAP response, a call setup message, directed toward the address returned by NM 104 and including the number translation and LDN information returned by NM 104, may be issued. For example, originating SP 110 may send an ISUP initial address message (IAM) to recipient SP 114 (FIG. 1, message 3). In one embodiment, the ISUP IAM message may contain the original called party number value, "9193803814", stored in the general address parameter GAP, and may place the number translation and LDN information, "LRN1+9199420000", into the called party number parameter CdPN. In alternative embodiments, the number translation information and local directory number information may be stored together or separately, as well as with other information, and may be stored in parameters other than those described here. The call setup message may travel through node 102 on its way to the destination, recipient SP 114. Upon acceptance of the call setup message, a bearer channel may be established between originating SP 110 and recipient SP 114, such as trunk2 118.

In one embodiment, recipient SP 114 may detect that the CdPN parameter contains LDN information, and use that LDN information to redirect the incoming call to a local directory number. For example, recipient SP 114 may determine that the CdPN parameter of call setup message (FIG. 1, message 3) includes the location routing number prepended to the local directory number. Recipient SP 114 may then connect the incoming call to the internal port associated with the local directory number "9199420000".

Figure 3:
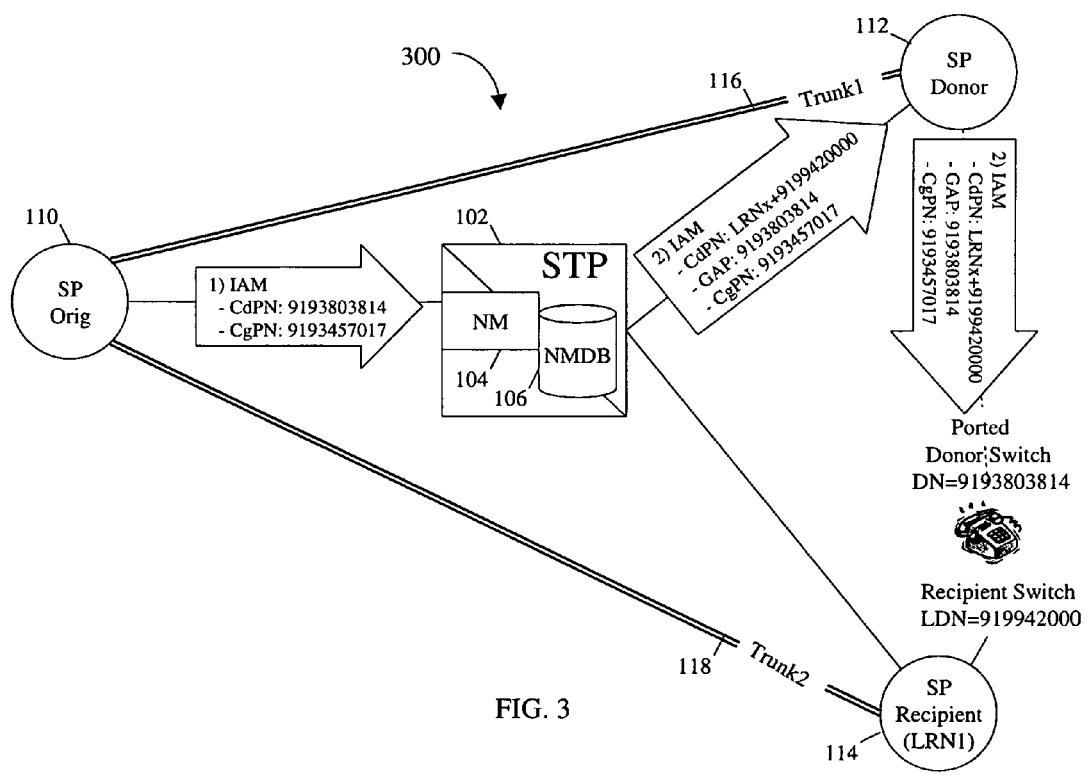
FIG. 3 is a block diagram illustrating an exemplary system for providing triggerless number translation with local directory number support according to an embodiment of the subject matter described herein.

FIG. 3 is a block diagram illustrating an exemplary system for providing triggerless number translation with local directory number support according to an embodiment of the subject matter described herein. Unlike a triggered implementation of a number translation function, in which the number translation is performed in response to a specific request, a triggerless number translation function does not require that a particular request for number translation be issued by an originating SP; instead, a number translation may be performed upon the satisfaction of one or more conditions, or upon detection of specified types of signaling messages.

In one embodiment, system 300 is substantially identical to system 100 illustrated in FIG. 1, except that in the embodiment illustrated in FIG. 3, node 102 is configured to intercept a first call setup signaling message that originates from a switching point, is associated with a call in a communications network, and contains information identifying a subscriber, a message source, and a message destination; number translation module NM 104 is configured to determine, using the information identifying the subscriber, whether number translation and LDN information exists for the identified subscriber, and, in response to determining that the number translation and LDN information exists, send a second call setup message that includes the number translation information and LDN information for the identified subscriber.

In a number portability example, when a call is made to a ported subscriber, originating SP 110 may have a software-implemented mechanism, referred to as a trigger, which detects that a number translation is required, and in response may issue a query to an NP database. However, if originating SP 110 is a legacy switching point, originating SP 110 may not yet include the capability to detect that the called party directory number is ported, generate a trigger, and query a number portability database. Some telecommunications networks include many legacy switching points that do not support number translation triggers. Upgrading each legacy switch in such networks to support number translation triggers would be time, labor, and cost intensive. Thus, an alternative solution is to provide a triggerless number translation function with local directory number support, such as the system shown in FIG. 3. An example operation of system 300 will now be described with reference to FIG. 4.

Figure 4:
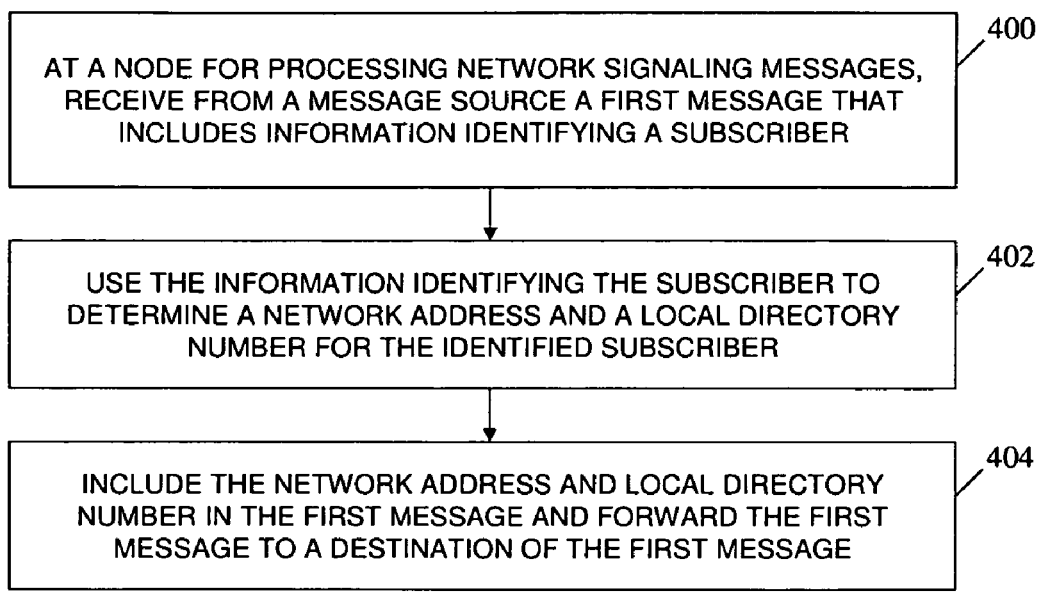
FIG. 4 is a flow chart illustrating an exemplary process for performing triggerless number translation with local directory number support according to an embodiment of the subject matter described herein.

FIG. 4 is a flow chart illustrating an exemplary process for performing triggerless number translation with local directory number support according to an embodiment of the subject matter described herein.

At block 400, a first message, sent from a message source and including information identifying a subscriber, is received at a node for processing network signaling messages. For example, the first message may be a call setup signaling message originating from a switching point and intercepted at a signaling message routing node. In the embodiment illustrated in FIG. 3, node 302 may receive a call setup message (FIG. 3, message 1), such as an ISUP or broadband ISUP (B-ISUP) IAM or SAM message or a SIP invite message, from originating SP 110. In alternative embodiments, node 302 may receive a call setup message from a public switched telephone network (PSTN) end office, a mobile switching center (MSC), a media gateway controller (MGW), and/or a softswitch (SS). The identified subscriber may be the called party, the calling party, or another subscriber associated with the call. The information identifying the subscriber may be the subscriber's telephone number, URI, SIP address, or other information that identifies the subscriber. The information identifying the message source and message destination may be the calling and called party numbers, respectively. For example, FIG. 3, message 1 may be an ISUP IAM message sent from originating SP 110 to node 302, including information identifying the calling subscriber and the called subscriber: calling party number (CgPN) 9193803814 and called party number (CdPN) 9193457017, respectively.

At block 402, the information identifying a subscriber is used to determine a network address and local directory number (LDN) associated with the identified subscriber. In one embodiment, NM 104 may query NMDB 106 to obtain number translation and LDN information for called party number 9193457017. If the call destination should be redirected from donor SP 112 to recipient SP 114, NMDB 106 may return a network address for recipient SP 114. In FIG. 3, the network address for recipient SP 114 is a location routing number, the value of which is represented by the string "LRN1".

At block 404, the network address and local directory number associated with the subscriber are included in the first message, which is then forwarded to its intended destination. In the embodiment illustrated in FIG. 3, the first call message (FIG. 3, message 1) is modified to include a location routing number, LRN1, prepended to the LDN, "9199420000" and stored in the called party number parameter, CdPN. The original called party parameter value is stored in the general address parameter. The modified message (FIG. 3, message 2) is then forwarded to its intended destination, donor SP 112.

In one embodiment, donor SP 112 may, upon receiving the modified message, relay the modified message to its new destination based on the value of the CdPN parameter. For example, donor SP 112 may detect that the CdPN parameter value consists of a location routing number, LRN1, prepended to a local directory number, "9199420000", and determine that the modified call setup message should be relayed to recipient SP 114. In one embodiment, recipient SP 114 is responsible for determining that the CdPN parameter contains both LRN and LDN information and perform further routing based on the LDN information.

In an alternate embodiment, the call setup signaling message (e.g., ISUP IAM) received at the signaling message routing node is modified to include the LRN and LDN information. The modified ISUP IAM message is then transmitted from the routing node.

In yet another alternative embodiment, the second call setup message is sent to the source rather than the destination of the first call setup message, will now be described with reference to FIG. 5.

Figure 5:
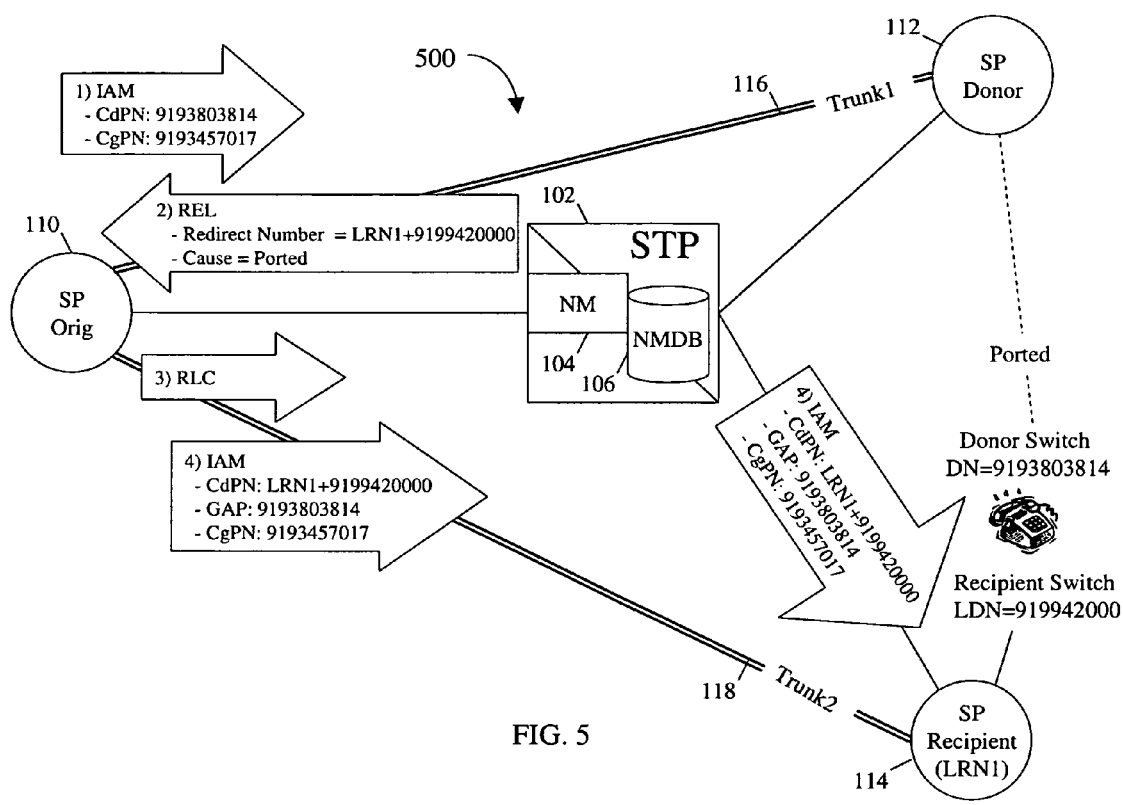
FIG. 5 is a block diagram illustrating an exemplary system for providing triggerless number translation with local directory number support and with release according to another embodiment of the subject matter described herein.

FIG. 5 is a block diagram illustrating an exemplary system for providing triggerless number translation with local directory number support and with release according to another embodiment of the subject matter described herein. In one embodiment, system 500 is substantially identical to the system described in FIG. 3, above, except that in the embodiment illustrated in FIG. 5, NM 104 is configured to determine, using the information identifying a subscriber, whether number translation information and LDN information exists for the identified subscriber, and, in response to determining that number translation information and LDN information exists, send, to the message source, a second call setup message (e.g., ISUP REL) including an instruction for releasing the current bearer path and selecting a new bearer path based on the LRN and LDN information for the identified subscriber.

For example, originating SP 110 may send a first call setup message directed toward donor SP 112 and containing calling and called party subscriber information (FIG. 5, message 1). Originating SP 110 may reserve a connection on trunk1 116, which connects originating SP 110 to the anticipated destination switching point, donor SP 112. The first call setup message (e.g., ISUP IAM) may be intercepted by communications node 102, which may route the message internally to NM 104 for processing. NM 104 may extract subscriber information, such as the called party subscriber number 9193803814, from the first call setup message and use this extracted subscriber information to determine whether number translation and LDN information exists for the called party. For example, NM 104 may query NMDB 106, and NMDB 106 may respond with a location routing number, "LRN1", along with a LDN number, "9199420000".

NM 104 may then send to originating SP 110 a second call setup message including an instruction for releasing the current bearer path and selecting a new bearer path based on the LRN and LDN information for the identified subscriber. For example, NM 104 may send an ISUP release (REL) message (FIG. 5, message 2) that includes the number translation information prepended to the local directory number and stored in the "redirect number" parameter. In one embodiment, the second call setup message may include information indicating the reason for requesting the release of the bearer path. For example, the ISUP REL message (FIG. 5, message 2) may include a cause parameter, whose value indicates that the called party has been ported.

In response to receiving the instruction for releasing the current bearer path and selecting a new bearer path, originating SP 110 may release the bearer channel currently reserved in trunk1 116. In one embodiment, originating SP 110 may then acknowledge the fact that the release message has been accepted and/or that the release has been performed. For example, FIG. 5, message 3 is an ISUP release complete (RLC) message sent by originating SP 110 to communications node 102 to acknowledge that the bearer channel in trunk1 116 has been released. Originating SP 110 may then issue a third call setup message, this time directed to recipient SP 114. For example, FIG. 5, message 4 is an ISUP IAM message sent from originating SP 110 to recipient SP 114, in which the original called party number is stored in the general address parameter (GAP), and the number translation information is prepended to the LDN information and stored in the called party number parameter. Originating SP 110 may reserve a bearer channel in Trunk2 118, which connects originating SP 110 to recipient SP 114.

This second call setup message may be received by communications node 102 on its way to recipient SP 114. In one embodiment, communications node 102 may recognize that number translation information for the called party has already been determined and thus forward the setup message to its destination without performing a number translation information lookup. For example, communications node 102 may assume that any call setup message with a GAP parameter containing a value is a message for which number translation information has already been determined. Alternatively, either communications node 102 or NM 104 may use another message parameter or field, such as an NP lookup flag, to determine whether or not call number translation information lookup has been performed. Other methods of determining that call redirection has already been performed, such as the use of other parameters, other parameter values, and the like, are within the scope of the subject matter described herein.

FIGS. 1 and 3 illustrate embodiments in which NM 104 is co-located with NMDB 106. In an alternative embodiments, NMDB 106 may be remote to (i.e., not co-located with) the NM 104. An example of such an embodiment will now be described with reference to FIG. 6.

Figure 6:
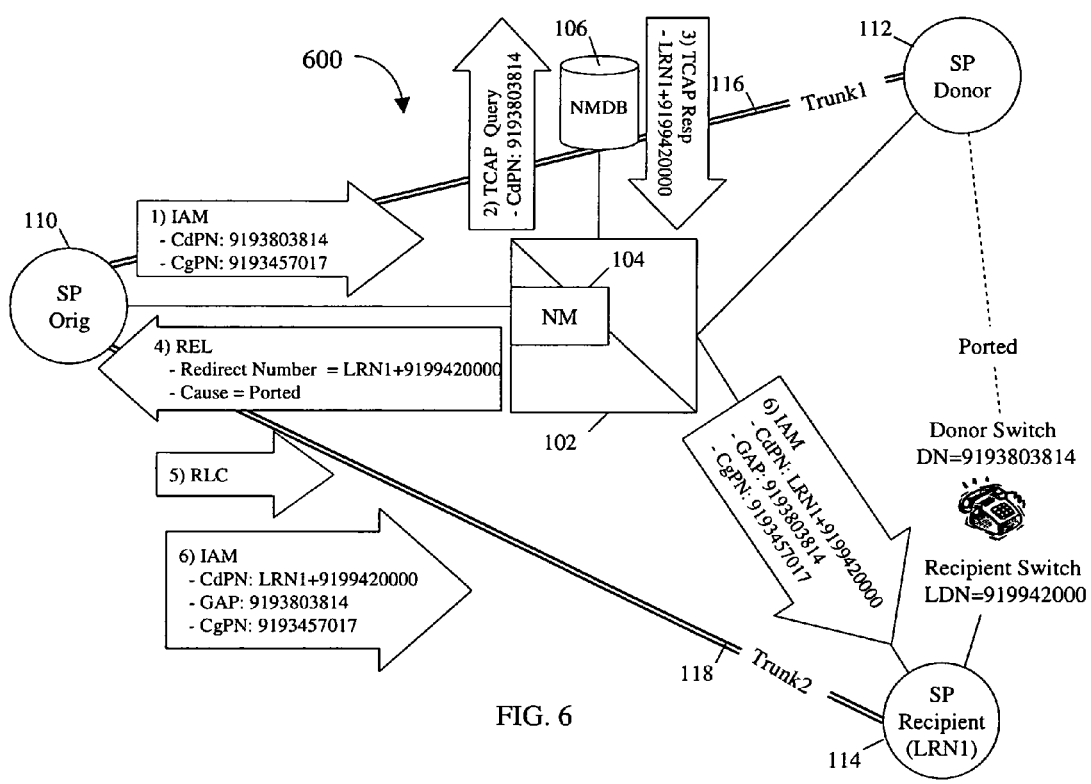
FIG. 6 is a block diagram illustrating an exemplary system for providing triggerless number translation with local directory number support using a remote database according to another embodiment of the subject matter described herein.

FIG. 6 is a block diagram illustrating an exemplary system for providing triggerless number translation with local directory number support using a remote database according to another embodiment of the subject matter described herein. In one embodiment, system 600 is substantially identical to the system described in FIG. 5, above, except that in the embodiment illustrated in FIG. 6, NMDB 106 is configured as a remote database, i.e., not co-located with NM 104, and NM 104 is configured to remotely access NMDB 106. It will be noted that other variations of number translation functions, e.g., triggered or triggerless, with or without release, etc., that return number translation and LDN information may be performed by NM 104 and are within the scope of the subject matter described herein.

An example operation of system 600 will now be described. In one embodiment, FIG. 6, message 1 is an ISUP IAM message containing the calling and called party numbers, stored in the CgPN and CdPN message parameters, respectively. Originating SP 110 may reserve a connection to donor SP 112 on trunk1 116. FIG. 6, message 1 may be intercepted by NM 104, which may extract subscriber information, such as CgPN, CdPN, or other subscriber information that may be contained in the message.

In one embodiment, NM 104 may generate a query to NMDB 106 using the extracted called party subscriber information. For example, FIG. 6, message 2 is a transaction capabilities application part (TCAP) query message requesting NP information for the called party subscriber, CdPN. In alternative embodiments, NM 104 may access NMDB 106 using one or more of a variety of protocols, such as a TCAP protocol using SS7 or SS7 over IP (SIGTRAN) signaling links, an Internet protocol (IP), a signaling connection and control part (SCCP) user adaptation (SUA) protocol, a session initiation protocol (SIP), an extensible markup language (XML) protocol, a hypertext transfer protocol (HTTP), and a simple object access protocol (SOAP). Other protocols suitable for retrieving information indicating that the call should be redirected are within the scope of the subject matter described herein.

NMDB 106 may respond with number translation and LDN information associated with the subscriber. For example, NMDB 106 may extract the subscriber information from the query, use the subscriber information to find a number translation and LDN information, and send to NM 104 a query response message including the number translation and LDN information associated with the subscriber. In one embodiment, the number translation information may include a location routing number, which may be used to identify a switching point in the network. For example, FIG. 6, message 3, is a query response message that returns the called party's location routing number, "LRN1", prepended to the called party's local directory number, "9199420000".

Upon receipt of the number translation and LDN information from NMDB 106, NM 104 may send to originating SP 110 a release message containing the number translation and LDN information. For example, FIG. 6, message 4 is an ISUP REL message that includes a redirect number parameter for identifying a new call destination. In one embodiment, the release message may include a cause parameter for indicating the reason for the release. In FIG. 6, message 4, the redirect number parameter contains the number translation information prepended to local directory number, and the cause parameter indicates that the release is being requested because the called party subscriber has been ported. Upon receipt of the REL message, originating SP 110 may release the bearer channel previously reserved in trunk1 116. Originating SP 110 may or may not acknowledge the release. In one embodiment, FIG. 6, message 5 is an ISUP RLC message sent from originating SP 110 to communications node 102 to confirm the release of bearer channel through trunk1 116.

In one embodiment, originating SP 110 may then send a call setup message directed toward the new call destination, recipient SP 114. For example, FIG. 6, message 6 is an ISUP IAM message in which the called party parameter CdPN contains the number translation information prepended to the LDN information. Originating SP 110 may reserve a bearer channel in a trunk connecting originating SP 110 and recipient SP 114, such as trunk2 118. This second call setup message may be received by communications node 102 on its way to recipient SP 114. In one embodiment, communications node 102 may recognize that number translation and LDN information for the called party has already been determined and thus may forward the setup message to its destination without performing a number translation and LDN information lookup.

Figure 7:
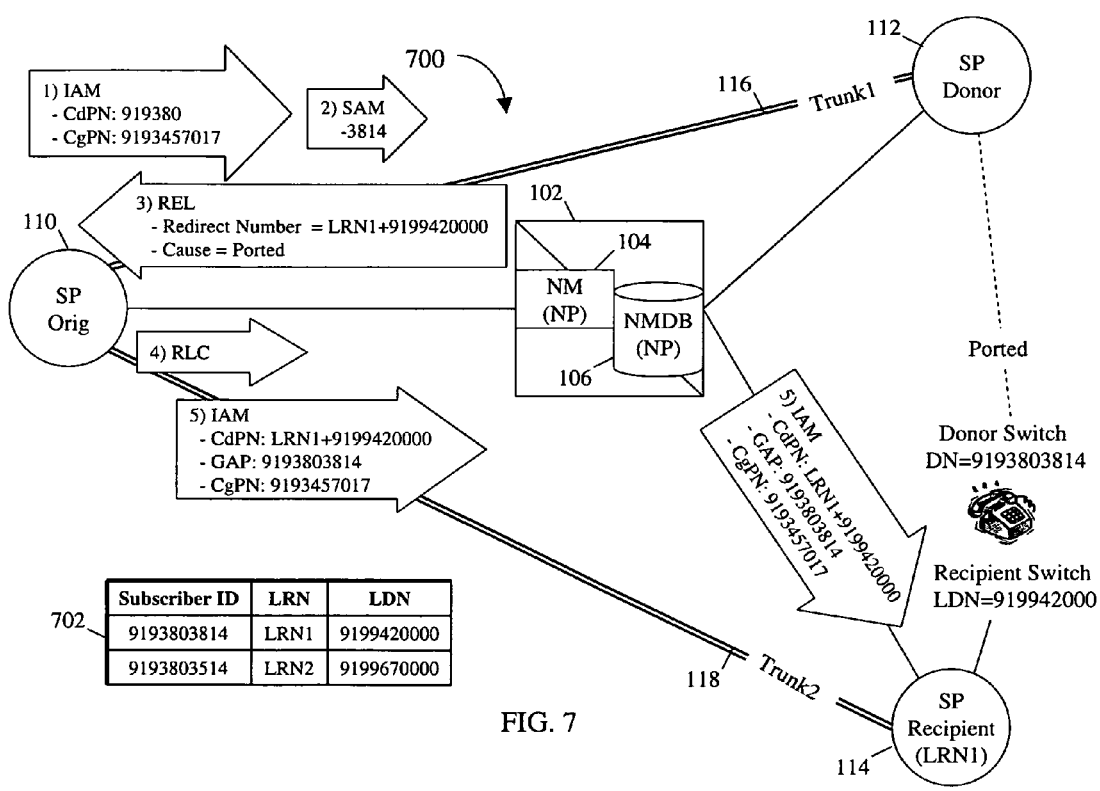
FIG. 7 is a block diagram illustrating an exemplary system for providing number translation with local directory number support using a number portability (NP) function according to another embodiment of the subject matter described herein.

FIG. 7 is a block diagram illustrating an exemplary system for providing number translation with local directory number support using a number portability (NP) function according to another embodiment of the subject matter described herein. In one embodiment, system 700 is substantially identical to the system described in FIG. 5, above, except that in the embodiment illustrated in FIG. 7, communications node 102 is configured to support the use of ISUP subsequent address messages (SAMs), which are used to convey additional address information not contained in the initial address message or IAM. In an alternative embodiment, another component of system 700, such as triggerless number translation with release function NM 104, may be adapted to support the use of ISUP SAMs. In one embodiment, the number translation function performed by NM 104 may include a number portability lookup for determining whether a subscriber has been ported from one switching point to another switching point. For example, NM 104 may query NMDB 106 to determine whether the subscriber has been assigned a location routing number and local directory number.

In one embodiment, originating SP 110 may send an ISUP IAM message (FIG. 7, message 1) to communications node 102, where the message is processed by NM 104. originating SP 110 may reserve a channel on a trunk connecting originating SP 110 to the anticipated destination donor SP 112, trunk1 116. In one embodiment, communications node 102 may determine that there is not sufficient called party subscriber information with which to perform a number translation and LDN information lookup, in which case communications node 102 may temporarily buffer or store the IAM message and wait for additional information from originating SP 110. Later, communications node 102 may receive from originating SP 110 an ISUP SAM message (FIG. 7, message 2) containing additional called party subscriber address information. If communications node 102 determines that it still does not have enough called party subscriber information, it may continue to wait for additional SAMs; otherwise, communications node 102 may forward the complete message information to NM 104. NM 104 may proceed with a number portability query or other method to determine whether there is number translation and LDN information associated with the called party subscriber. In an alternative embodiment, NM 104 may process the IAM and SAM messages, temporarily buffering them until sufficient information is received.

If NM 104 receives from NMDB 106 number translation information indicating that the called party has been ported to recipient SP 114, NM 104 may send to originating SP 110 a release message including information for releasing the current bearer path and selecting a new bearer path based on the number translation and LDN information associated with the subscriber (FIG. 7, message 3). Originating SP 110 may send an acknowledgement of the release (FIG. 7, message 4) and release the bearer channel previously reserved in trunk1 116. Originating SP 110 may then attempt to establish a call to recipient SP 114, including reserving a channel on Trunk2 118, by sending another call setup message to recipient SP 114 (FIG. 7, message 5) via communications node 102.

The number translation function that may be performed by NM 104 is not limited to number portability. Other types of number translation with local directory number support may be performed by NM 104, as will now be described.

Figure 8:
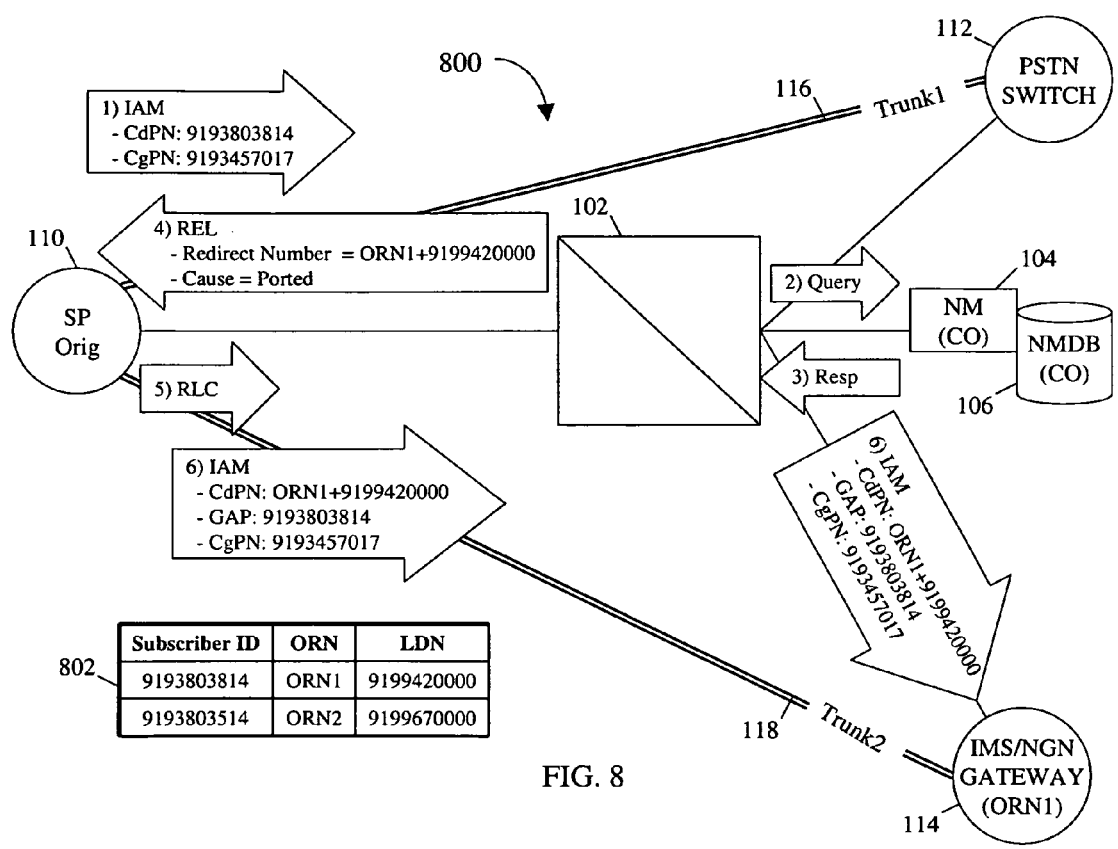
FIG. 8 is a block diagram illustrating an exemplary system for providing triggerless number translation with local directory number support using a call offload (CO) function according to another embodiment of the subject matter described herein.

FIG. 8 is a block diagram illustrating an exemplary system for providing triggerless number translation with local directory number support using a call offload (CO) function according to another embodiment of the subject matter described herein. The triggerless CO function may be used to offload calls from a circuit switched network, such as a PSTN, without using network bearer trunk resources inefficiently and without requiring trigger upgrades for IN/AIN switching offices or other switching points.

In one embodiment, system 800 is substantially identical to the system described in FIG. 5, above, except that in the embodiment illustrated in FIG. 8, NM 104 is configured to perform a call offload (CO) lookup for determining whether the call should be redirected from a switching point in one type of network, such as an SS7-based network, to a switching point in another type of network, such as a non-SS7-based network, and NMDB 106 is configured to store call offload information. In the embodiment illustrated in FIG. 8, both NM 104 and NMDB 106 are not co-located with communications node 102.

Example SS7/SIGTRAN-based networks include a public switched telephone network (PSTN), a second generation (2G) wireless network, a global system for mobile communications (GSM) network, and an interim standard 41 (IS-41) network. Example non-SS7/SIGTRAN-based networks include an IP multimedia subsystem (IMS) network, a next generation network (NGN), a session initiation protocol (SIP) network, and a H.323 network. For example, donor SP 112 may be a switch in a PSTN, while recipient SP 114 may be IMS media gateway.

Example call offload information may include IMS network offload routing information, NGN network offload routing information, SIP network offload routing information, H.323 network offload routing information. NMDB 106 may contain one or more CO+LDN records 802 for associating a subscriber with a network node, such as a switching point, an application server, a gateway node, etc. The subscriber may be identified by a subscriber ID or other identifying information, such as URI, SIP address, etc. The network node may be identified by an offload routing number (ORN), a point code/subsystem number, a URI, an IP address, or other network entity address. For example, each CO+LDN record 802 may associate a called party number with an ORN and a local directory number. In one embodiment, NM 104 may query NMDB 106 to retrieve ORN and LDN information associated with a subscriber. In alternative embodiments, NM 104 may perform a table lookup, access a data structure in memory, or use some other means to retrieve ORN and LDN information associated with a subscriber. It will be appreciated, that in the case of the offloading of calls from a PSTN/circuit switched network to a non-PSTN/circuit switched network (e.g., to a SIP network or an IMS network), an LDN value may include any called subscriber identifier that is local to/private to the destination switching point. That is, exemplary LDN values may include E.164 formatted numerical telephone numbers, plain old telephone service (POTS) numbers, SIP URI values, and IP address values.

An example operation of system 800 will now be described. Originating SP 110 may send a call setup message to communications node 102. For example, originating SP 110 may send an ISUP IAM message that includes subscriber information identifying the called and calling parties, stored in parameters CdPN and CgPN, respectively (FIG. 8, message 1). Originating SP 110 may reserve a channel on a trunk connecting originating SP 110 to the anticipated destination. For example, originating SP 110 may reserve a channel on trunk1 116, which connects originating SP 110 to donor SP 112, which in one embodiment is a switch on a PSTN or other SS7-based network.

Communications node 102 may issue a query (FIG. 8, message 2) containing information identifying the subscriber to the remotely-located NM 104. In response to receiving the query, NM 104 may perform a triggerless call offload (TCO) function. For example, NM 104 may query NMDB 106 using the called party subscriber identifier and/or the calling party subscriber identifier. If a matching entry is located in NMDB 106, an ORN and LDN may be returned (FIG. 8, message 3) indicating that the call should be offloaded to another network via the recipient SP. For example, NMDB 106 may return ORN1, which may be the address of a node, such as IMS/NGN gateway 112, associated with a non-SS7-based network, and a local directory number for the subscriber.

In one embodiment, NM 104 may send to originating SP 110 a release message including information for releasing the current bearer path and selecting a new bearer path based on the number translation and LDN information associated with the subscriber. For example, FIG. 8, message 4 may be an ISUP REL message that includes the number translation information, "ORN1", prepended to the LDN and stored in a redirect number parameter. In one embodiment, the release message may include a cause parameter for indicating the reason for the call release. For example, FIG. 8, message 4 may include a cause parameter indicating that the call release was the result of an IMS offload, wherein a call is offloaded from an SS7-based network onto an IMS (i.e., packet-based) network.

In one embodiment, originating SP 110 may send an acknowledgement of the release, as shown in FIG. 8, message 5. Originating SP 110 may release the previously reserved connection to trunk1 116 and attempt to establish a call to recipient SP 114, including reserving a channel on Trunk2 118. For example, FIG. 8, message 6 may be a second call setup message, sent from originating SP 110 to recipient SP 114 via communications node 102, in which the number translation information "ORN1" and LDN information "9199420000" are both contained in the CdPN parameter and the original CdPN parameter is stored in the GAP. In one embodiment, communications node 102 and/or NM 104 may support the use of ISUP SAM messages, as described in FIG. 7.

Figure 9:
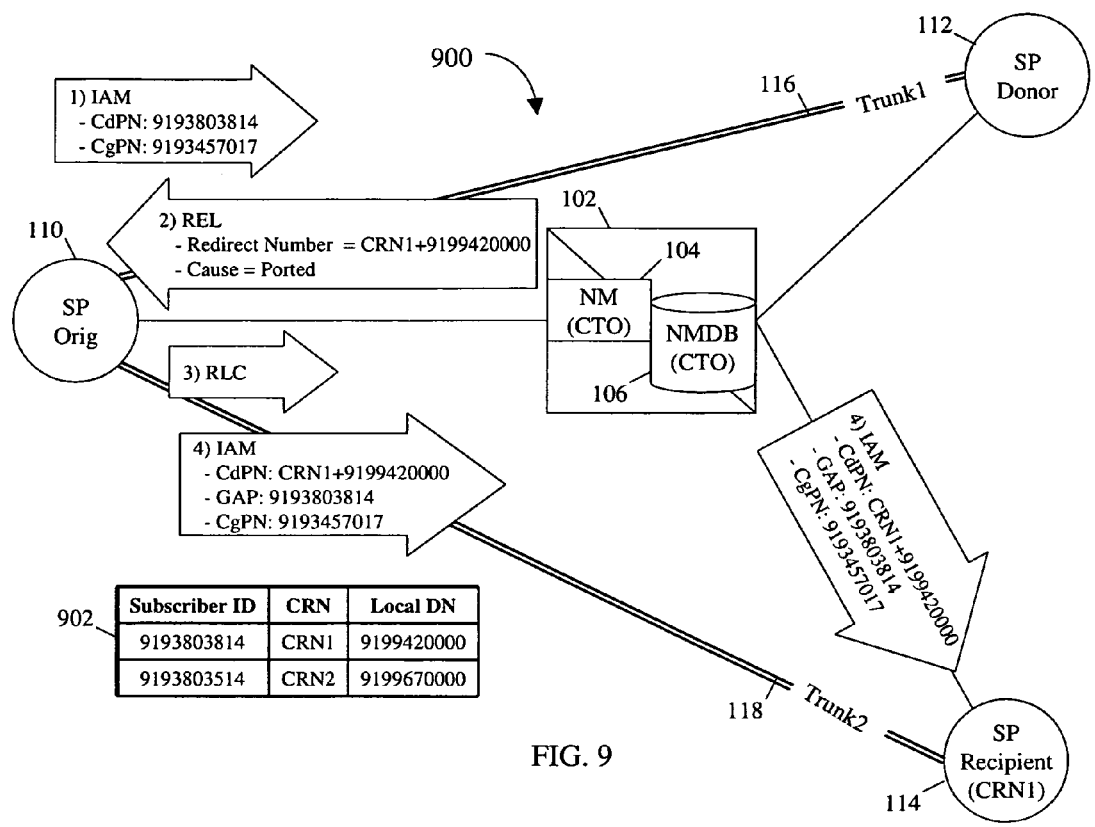
FIG. 9 is a block diagram illustrating an exemplary system for providing triggerless number translation with local directory number support using a switching office cutover (CTO) function according to another embodiment of the subject matter described herein.

FIG. 9 is a block diagram illustrating an exemplary system for providing triggerless number translation with local directory number support using a switching office cutover (CTO) function according to another embodiment of the subject matter described herein. The triggerless CTO function may be used to "cut over" or migrate subscribers from a donor switching office to recipient switching office in an SS7/SIGTRAN-based communications network, such as a PSTN, without using network bearer trunk resources inefficiently and without requiring trigger upgrades for IN/AIN switching offices or other switching points.

In one embodiment, system 900 is substantially identical to the system described in FIG. 5, above, except that in the embodiment illustrated in FIG. 9, NM 104 is configured to perform a switching office cutover (CTO) lookup for determining whether a call should be redirected from one central office to another central office, and NMDB 106 is configured to store switching office cutover information. Switching office cutover may be used to facilitate the migration of subscribers between traditional TDM/circuit switched end offices, or between TDM switching offices and packet switching offices (e.g., MGC, softswitch), or between packet switching offices. For example, donor SP 112 may be an obsolete central office whose functions and/or subscribers are being taken over by a newer, more capable recipient SP 114.

It will be appreciated, that in the case of the cutover of calls from a PSTN/circuit switched network to a non-PSTN/circuit switched network (e.g., to a SIP network or an IMS network), an LDN value may include any called subscriber identifier that is local to/private to the destination switching point. That is, exemplary LDN values may include E.164 formatted numerical telephone numbers, plain old telephone service (POTS) numbers, SIP URI values, and IP address values.

In one embodiment, NMDB 106 may contain one or more CTO+LDN records 902 for associating a subscriber with the network address of a network node, such as a switching point, an application server, a gateway node, etc. The subscriber may be identified by a subscriber ID or other identifying information, such as URI, SIP address, etc. The address of the network node may be a cutover routing number (CRN), a point code/subsystem number, a URI, an IP address, or other network address. For example, each CTO+LDN record 902 may associate a called party number with an CRN. In one embodiment, NM 104 may query NMDB 106 to retrieve an cutover routing number associated with a subscriber. In alternative embodiments, NM 104 may perform a table lookup, access a data structure in memory, or use some other means to retrieve switching office cutover information associated with a subscriber.

The operation of system 900 is essentially identical to the operation of system 800, except that the triggerless CO function and database of FIG. 8 is replaced with a triggerless CTO function and database in FIG. 9, and the number translation information associated with the subscriber may be a CRN instead of an ORN. For example, FIG. 9, message 1 may be an ISUP IAM message containing subscriber identifiers CdPN and CgPN. FIG. 9, message 2 may be an ISUP REL message which includes a redirect number parameter containing the CRN associated with a subscriber, "CRN1", prepended to the LDN for the subscriber, "9199420000", and a cause parameter indicating that the redirection is due to a switching office cutover. FIG. 9, message 3 may be an ISUP RLC message indicating that the bearer channel reserved in trunk1 116 has been released. FIG. 9, message 4 may be an ISUP IAM message sent to recipient SP 114 via communications node 102 requesting connection via Trunk2 118. In one embodiment, communications node 102 and/or NM 104 may support the use of ISUP SAM messages, as described in FIG. 7.

Figure 10:
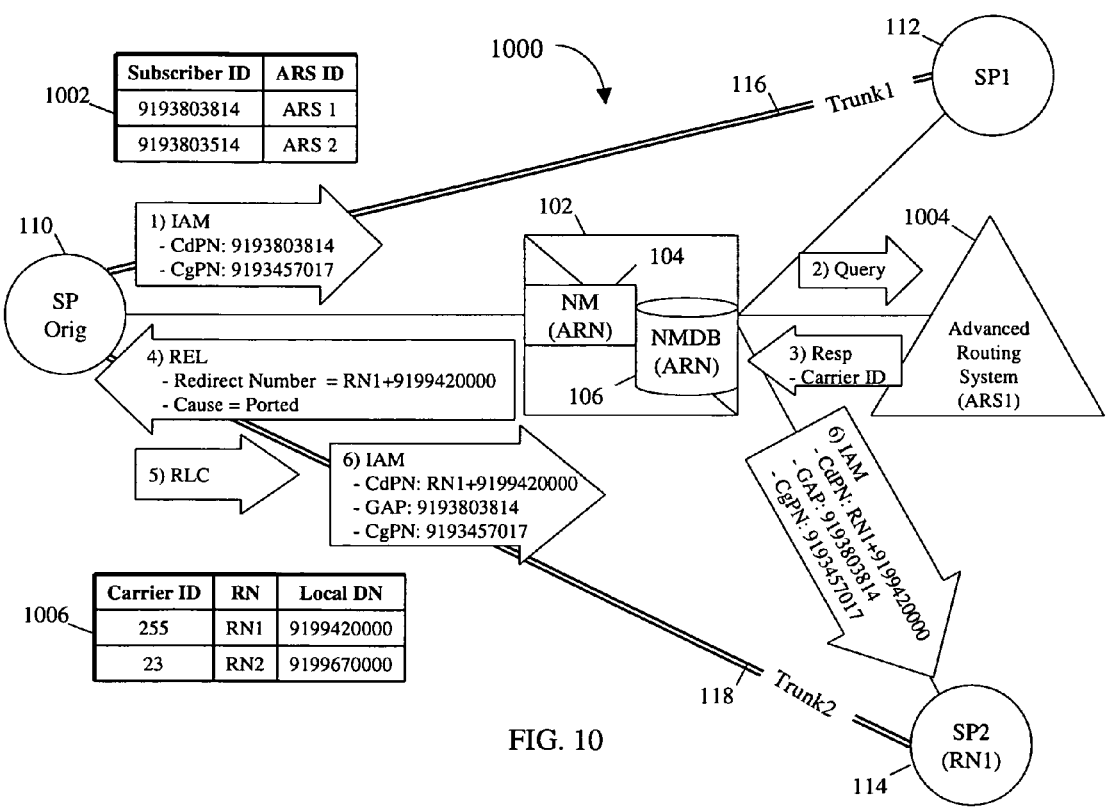
FIG. 10 is a block diagram illustrating an exemplary system for providing triggerless number translation with local directory number support using an advanced routing number (ARN) lookup function according to another embodiment of the subject matter described herein.

FIG. 10 is a block diagram illustrating an exemplary system for providing triggerless number translation with local directory number support using an advanced routing number (ARN) lookup function according to another embodiment of the subject matter described herein. The triggerless ARN function allows advanced routing rules to be accessed and asserted/enforced without requiring the originating or intermediate switching offices or other switching points to support IN/AIN-based advanced routing systems, enabling a network operator to provide advanced routing services without using network bearer trunk resources inefficiently and without requiring switching office IN/AIN trigger upgrades.

In one embodiment, system 1000 is substantially identical to the system described in FIG. 5, above, except that in the embodiment illustrated in FIG. 10, NM 104 is configured to perform an advanced routing number (ARN) lookup for redirecting a call based on parameters, such as time of day, day of week, day of year, geographic location of the caller, or other parameter used to redirect a call, and NMDB 106 is configured to store advanced routing information. For example, donor SP 112 may be the called party's business office in the eastern hemisphere and recipient SP 114 may be the called party's business office in the western hemisphere, and the lookup will direct the call to one or the other depending on which office is open at the time the call is initiated. The triggerless ARN function may be used to implementing advanced routing services (e.g., least cost routing, time of day routing, etc.) in an SS7/SIGTRAN-based communications network, such as a PSTN, without using network bearer trunk resources inefficiently and without requiring that the originating or intermediate switching points support IN/AIN-based advanced routing systems. This allows a network operator to provide advanced routing services without requiring switching office IN/AIN trigger upgrades.

In one embodiment, system 1000 may perform a triggerless number translation function with local number support. In the embodiment illustrated in FIG. 10, message 1 is an ISUP IAM message for setting up a call between a calling party and a called party, identified by directory number contained in parameters CgPN and CdPN, respectively. The ISUP IAM message is received by communications node 102, which passes the message to NM 104 for processing. NM 104 may query NMDB 106 to retrieve advanced routing number information associated with a carrier and/or subscriber. In one embodiment, NMDB 106 may contain one or more of a first type of ARN record 1002 for identifying subscribers that have advanced routing service. The subscriber may be identified by a subscriber ID or other identifying information, such as URI, SIP address, etc. For example, each ARN record 1002 may associate a subscriber, such as the calling party or the called party, with an advanced routing system server, identified by an ARS ID. The ARS ID may be a network address, a host name, a routing number, a point code/subsystem number, an IP address, a URI, or other means to identify an ARS server or other network node. In the embodiment illustrated in FIG. 10, ARS queries related to subscriber 9193803814 will be directed to ARS server "ARS1", while ARS queries related to subscriber 9193803514 will be directed to ARS server "ARS2", not shown.

In one embodiment, NM 104 may then use the information returned from NMDB 106 to query an advanced routing system ARS 1004 to obtain additional ARN information. For example, NM 104 may send a first query to NMDB 106 and in response receive the address of the appropriate ARS server. For example, NM 104 may send a query including the subscriber's directory number to NMDB 106, and NMDB 106 may respond with the network address of the advanced routing system server that maintains information for the identified subscriber, which in this example is represented in FIG. 10 by the text string "ARS1". Once the address of the appropriate ARS server is known, NM 104 may then query the appropriate ARS server, ARS 1004, (FIG. 10, message 2); this query to the ARS server may include information identifying the subscriber, such as the subscriber's directory number, etc. ARS 1004 may respond to the query with advanced routing information associated with the subscriber. In one embodiment, ARS 1004 may return information identifying a carrier (FIG. 10, message 3) to NM 104. The carrier may be identified by a carrier identification code, or carrier ID, for example.

In one embodiment, NM 104 may query ARS 1004 only for those subscribers that have been identified by NMDB 106 as having advanced routing services. In an alternative embodiment, NM 104 may query ARS 1004 for every call setup message intercepted. It will be appreciated that advanced routing service may be provided based on either the called party subscriber identifier, the calling party subscriber identifier, or both.

In alternative embodiments, NMDB 106, ARS 1004, both, or neither may be co-located with NM 104. In embodiments in which ARS 1004 is co-located with NM 104, either as a database separate from NMDB 106 or merged into NMDB 106, the step of determining the ARS ID, and associated records such as ARN record 1002, may not be necessary. For remote databases (e.g., databases that are not co-located with NM 104), NM 104 may access the ARN information using SS7 TCAP, SIGTRAN SUA, SIP, XML, HTTP, SOAP, or any other suitable protocol. In alternative embodiments, NM 104 may perform a table lookup, access a data structure in memory, or use some other means to retrieve the advanced routing number information.

In one embodiment, NM 104 may then use the information returned from ARS 1004 to perform a second query to NMDB 106 to determine number translation and local directory number information. For example, NMDB 106 may contain one or more of a second type of ARN record 1006 for associating a carrier ID with number translation and local directory number information.

Upon receiving the number translation and LDN information, NM 104 may issue to originating SP 110 a release message including information for releasing the current bearer path and selecting a new bearer path. For example, FIG. 10, message 4, may be an ISUP REL message including a redirect number parameter containing the carrier routing number, "RN1", prepended to the original called party directory number, and a cause parameter indicating that the redirection is due to an advanced routing service instruction. FIG. 10, message 5 may be an ISUP RLC message indicating that the bearer channel reserved in trunk1 116 has been released. FIG. 10, message 6 may be an ISUP IAM message sent to recipient SP 114 via communications node 102 requesting connection via Trunk2 118. FIG. 10, message 6 may include the carrier routing number, "RN1", in the CdPN parameter and may store the original CdPN value in the GAP. In one embodiment, communications node 102 and/or NM 104 may support the use of ISUP SAM messages, as described in FIG. 7.

It will be appreciated that in an alternative embodiments, the systems illustrated in FIGS. 5 through 10 may provide triggerless number translation with local directory number support without release in a manner substantially similar to that performed by the system illustrated in FIG. 3. In each alternative embodiment, NM 104 is configured to receive from originating SP 110 a request for a number translation and, in response, retrieve the number translation and LDN information in the manner respectively described by each figure. NM 104 may then sending a call setup message including number translation and LDN information to the donor SP 112.

It will also be appreciated that in an alternative embodiments, the systems illustrated in FIGS. 5 through 10 may provide triggered rather than triggerless number translation with local directory number support in a manner substantially similar to that performed by the system illustrated in FIG. 1. In each alternative embodiment, NM 104 is configured to receive from originating SP 110 a request for a number translation and, in response, retrieve the number translation and LDN information in the manner respectively described by each figure, concluding by sending the retrieved number translation and LDN information back to originating SP 110 as a response to the original query.

Figure 11:
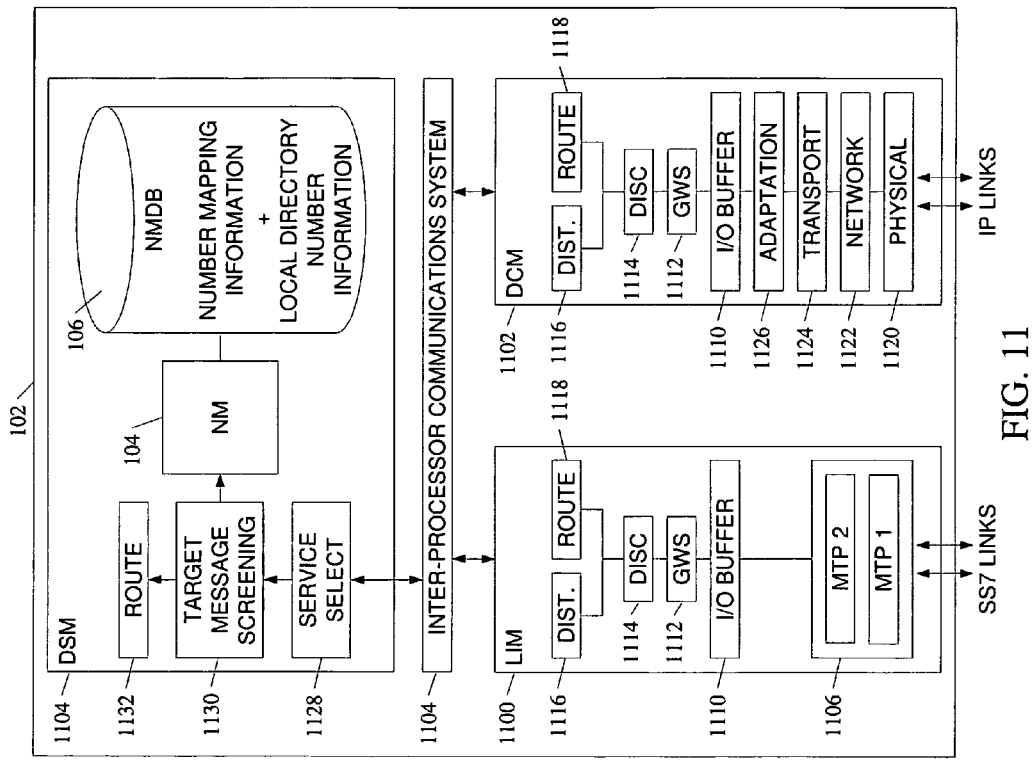
FIG. 11 is a block diagram illustrating an exemplary communications node for providing triggerless call redirection with release according to another embodiment of the subject matter described herein.

FIG. 11 is a block diagram illustrating an exemplary communications node 102 for providing triggerless number translation with local directory number support according to another embodiment of the subject matter described herein. In one embodiment, communications node 102 may be a signal transfer point (STP), including a link interface module (LIM 1100), a data communications module (DCM 1102), and a database services module (DSM 1104). Each module 1100, 1102, and 1104 may include a printed circuit board, an application processor for performing application level processing of signaling messages, and a communications processor for controlling inter-processor communications via inter-processor communications system 1106. Inter-processor communications system 1106 may be any suitable mechanism for providing message communication between processing modules 1100, 1102, and 1104. For example, inter-processor communications system 1106 may be a bus, an Ethernet LAN, or any other suitable mechanism for providing communications between processors.

Link interface module (LIM) 1100 may include various functions for sending and receiving signaling messages over SS7 signaling links, such as a message transfer part (MTP) level 1 and 2 function 1108, an I/O buffer 1110, a gateway screening (GWS) function 1112, a discrimination function 1114, a distribution function 1116, and a routing function 1118. MTP level 1 and 2 function 1108 performs MTP level 1 and 2 functions, such as error detection, error correction, and sequencing of signaling messages. I/O buffer 1110 stores inbound signaling messages before the messages are processed by higher layers. I/O buffer 1110 also stores outbound signaling messages waiting to be transmitted over a signaling link by MTP level 1 and 2 function 1108. Gateway screening function 1112 screens inbound signaling messages based on destination point code and, optionally, based on originating point code to determine whether the messages should be allowed into the network. Discrimination function 1114 analyzes the destination point code in each received signaling message to determine whether the signaling message should be processed by an internal processing module within communications node 102 or whether the message should be routed over an outbound signaling link. Discrimination function 1114 forwards messages that are to be internally processed to distribution function 1116. Discrimination function 1114 forwards messages that are to be routed over an outbound signaling link to routing function 1118.

Distribution function 1116 distributes messages that are identified as requiring internal processing to the appropriate internal processing module. For example, distribution function 1116 may forward SCCP messages to database services module 1104 for SCCP processing. Routing function 1118 routes signaling messages that are addressed to point codes other than the point code of communications node 102. For example, routing function 1118 may forward messages to another link interface module (not shown in FIG. 11) or to data communications node 102 for transmission over an outbound signaling link.

Data communications module (DCM) 1102 may include various functions for sending and receiving SS7 messages over IP signaling links, such as a physical layer function 1120, a network layer function 1122, a transport layer function 1124, an adaptation layer function 1126, and SS7 MTP functions 1110-818 as described with regard to LIM 1100. Physical layer function 1120 may be any suitable physical layer function for sending and receiving frames that encapsulate network layer packets. In one exemplary implementation, physical layer function 1120 may be implemented using an Ethernet transceiver, and network layer function 1122 may be implemented using Internet protocol, such as IPv4 or IPv6. Transport layer function 1124 may be implemented using any suitable transport layer protocol. Examples of transport protocols suitable for use with embodiments of the subject matter described herein include user datagram protocol (UDP), transmission control protocol (TCP), and stream control transmission protocol (SCTP). Adaptation layer function 1126 may be implemented using any suitable adaptation layer for sending SS7 messages over IP. Examples of adaptation layers suitable for use with the subject matter described herein include M3UA, M2PA, SUA, and TALI, as described in the correspondingly named IETF Internet drafts and RFCs. The remaining functions of DCM 1102 are the same as those described with regard to LIM 1100. Hence, a description thereof will not be repeated herein.

Database services module (DSM) 1104 may include various functions and databases for processing signaling messages, such as a service selection function 1128, a target message screening function 1130, and a routing function 1132. DSM 1104 may include a triggerless call redirection/release function NM 104 and a call redirection/release information database NMDB 106. NM 104 may include one or more sub-functions for performing a variety of call redirection information lookups. For example, NM 104 may include a number portability lookup function, a call offloading lookup function, a switching office cutover lookup function, and an advanced routing number lookup function. Similarly, NMDB 106 may include redirection information associated with number portability, redirection information associated with call offloading, redirection information associated with switching office cutover, and redirection information associated with advanced routing systems.

Service selection function 1128 receives messages from interface processors and determines the type of service required for each message. For example, service selection function 1128 may determine whether further screening of messages is required or whether the messages are simply to be routed, with or without global title translation. For CAP or INAP messages, service selection function 1128 may forward the messages to target message screening function 1130. Target message screening function 1130 screens CAP or INAP messages received by DSM 1104 to identify targeted message types. According to the subject matter described herein, target message screening function 1130 may identify call setup messages, such as ISUP IAM or SAM, as a targeted message type requiring further processing. For call setup messages, targeted message screening function 1130 may communicate with NM 104 to perform a call redirection information lookup.

NM 104 may perform one or more redirection information lookups. For example, one of the sub-functions may query respective databases to determine if redirection information exists for a particular subscriber (and/or carrier, in the case of an advanced routing number lookup.) The operation of these various redirection information lookup functions are the same as previously described. Hence, a description thereof will not be repeated herein. If NM 104 determines that redirection information exists for a subscriber, it may generate a message for releasing the current bearer path and selecting a new bearer path, and route the generated message through the inter-processor communications system 1106 to the appropriate LIM or DCM according to the message destination.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing number translation with local directory number support, the system comprising:
   a communications node for receiving, from a message source, a first message that includes information identifying a subscriber;
   a number translation module, operatively associated with the communications node, for determining a network address and a local directory number associated with the identified a subscriber, and for at least one of:
      including the network address and local directory number in the first message and forwarding the first message to a destination of the first message; and
      including the network address and local directory number in a second message and sending the second message to the source of the first message.

2. The system of claim 1 wherein the communications node comprises one of a signal transfer point (STP), a service control point (SCP), an application server (AS), a session initiation protocol (SIP) application server, an Internet protocol multimedia subsystem (IMS) node, a next generation networking (NGN) node, a media gateway controller (MGC), a signaling gateway (SGW), and a session border controller (SBC).

3. The system of claim 1 wherein the source of the first message comprises one of a service switching point (SSP), a mobile switching center (MSC), a public switched telephone network (PSTN) end office, a media gateway controller (MGW), a softswitch (SS), a session initiation protocol (SIP) server, an Internet protocol (IP) multimedia subsystem (IMS) node, and a media resource function processor (MRFP).

4. The system of claim 1 wherein the information identifying a subscriber includes at least one of information identifying a called party and information identifying a calling party, and wherein the information identifying a subscriber includes at least one of a directory number (DN), a universal resource identifier (URI), a session initiation protocol (SIP) address, an Internet protocol (IP) address, a point code, and a point code/subsystem number (PC/SSN).

5. The system of claim 1 wherein the number translation module performs at least one of a number portability (NP) translation, a call offload (CO) translation, a switching office cutover (CTO) translation, and an advanced routing number (ARN) translation.

6. The system of claim 1 wherein the network address comprises at least one of a location routing number (LRN), a call offload routing number (ORN), a switching office cutover routing number (CRN), an advanced routing system identifier (ARS ID), a carrier routing number, a carrier identifier, a point code/subsystem number (PC/SSN), a universal resource identifier (URI), and an Internet protocol (IP) address.

7. The system of claim 1 comprising a number translation database (NMDB) for associating the network address and local directory number with the subscriber and wherein the number translation module determines whether the network address and local directory number exists for the identified subscriber by using the number translation database.

8. The system of claim 7 wherein the number translation database is co-located with the number translation module or geographically diverse from the number translation module.

9. The system of claim 1 wherein the number translation module uses at least one of a transaction capabilities application part (TCAP) protocol, an Internet protocol (IP), a signaling connection and control part (SCCP) user adaptation (SUA) protocol, a session initiation protocol (SIP), an extensible markup language (XML) protocol, a hypertext transfer protocol (HTTP), and a simple object access protocol (SOAP) for determining a network address and a local directory number associated with the identified a subscriber.

10. The system of claim 1 wherein the first message comprises a request for number translation and wherein the second message comprises a response to the request for number translation and is sent to the source of the first message.

11. The system of claim 1 wherein the first message comprises a call setup signaling message that originates from a switching point and that contains information identifying a destination of the message.

12. The system of claim 11 wherein the first call setup message comprises one of an ISUP initial address message (IAM), an ISUP subsequent address message (SAM), and a session initiation protocol (SIP) invite message.

13. The system of claim 11 wherein the second message comprises a call setup message that is sent to the source of the first message and that includes an instruction for releasing the current bearer path and selecting a new bearer path based on the number translation information and local directory number information for the identified subscriber.

14. A method for providing number translation with local directory number support, the method comprising:
   at a node for processing network signaling messages:
      receiving, from a message source, a first message that includes information identifying a subscriber;
      using the information identifying a subscriber to determine a network address and a local directory number for the identified subscriber; and
   at least one of:
      including the network address and local directory number in the first message and forwarding the first message to a destination of the first message; and
      including the network address and local directory number in a second message and sending the second message to the source of the first message.

15. The method of claim 14 wherein the node for processing network signaling messages comprises one of a signal transfer point (STP), a service control point (SCP), an application server (AS), a session initiation protocol (SIP) application server, an Internet protocol multimedia subsystem (IMS) node, a next generation networking (NGN) node, a media gateway controller (MGC), a signaling gateway (SGW), a session border controller (SBC), an interconnection border control function (IBCF) node, a media resource function controller (MRFC), and a breakout gateway control function (BGCF) node.

16. The method of claim 14 wherein receiving a first message includes receiving a first message from one of a service switching point (SSP), a mobile switching center (MSC), a public switched telephone network (PSTN) end office, a media gateway controller (MGW), a softswitch (SS), a session initiation protocol (SIP) server, an Internet protocol (IP) multimedia subsystem (IMS) node, and a media resource function processor (MRFP).

17. The method of claim 14 wherein the information identifying a subscriber includes at least one of information identifying a called party and information identifying a calling party, and wherein the information identifying a subscriber includes at least one of a directory number (DN), a universal resource identifier (URI), a session initiation protocol (SIP) address, an Internet protocol (IP) address, a point code, and a point code/subsystem number (PC/SSN).

18. The method of claim 14 wherein using the information identifying a subscriber to determine a network address and a local directory number for the identified subscriber includes performing at least one of a number portability (NP) lookup, a call offload (CO) lookup, a switching office (CTO) lookup, and an advanced routing number (ARN) lookup.

19. The method of claim 14 wherein the network address comprises at least one of a location routing number (LRN), a call offload routing number (ORN), a switching office cutover routing number (CRN), an advanced routing system identifier (ARS ID), a carrier routing number, a carrier identifier, a point code/subsystem number (PC/SSN), a universal resource identifier (URI), and an Internet protocol (IP) address.

20. The method of claim 14 wherein using the information identifying a subscriber to determine a network address and a local directory number for the identified subscriber includes using at least one of a transaction capabilities application part (TCAP) protocol, an Internet protocol (IP), a signaling connection and control part (SCCP) user adaptation (SUA) protocol, a session initiation protocol (SIP), an extensible markup language (XML) protocol, a hypertext transfer protocol (HTTP), and a simple object access protocol (SOAP).

21. The method of claim 14 wherein receiving the first message includes receiving one of a query message, an ISUP initial address message (IAM), an ISUP subsequent address message (SAM), and a session initiation protocol (SIP) invite message.

22. The method of claim 21 wherein sending the second message to the message source of the first message includes sending an instruction for releasing the current bearer path and selecting a new bearer path based on the number translation information and local directory number information for the identified subscriber.

23. The method of claim 22 wherein sending an instruction for releasing the current bearer path includes sending an ISUP release message.

24. A non-transitory computer readable medium having stored thereon computer-executable instructions that when executed by the processor of a computer perform steps comprising:
receiving, from a message source, a first message that includes information identifying a subscriber;
using the information identifying a subscriber to determine a network address and a local directory number for the identified subscriber; and
at least one of:
including the network address and local directory number in the first message and forwarding the first message to a destination of the first message; and
including the network address and local directory number in a second message and sending the second message to the source of the first message.

* * * * *